United States Patent Office 2,861,412
Patented Nov. 25, 1958

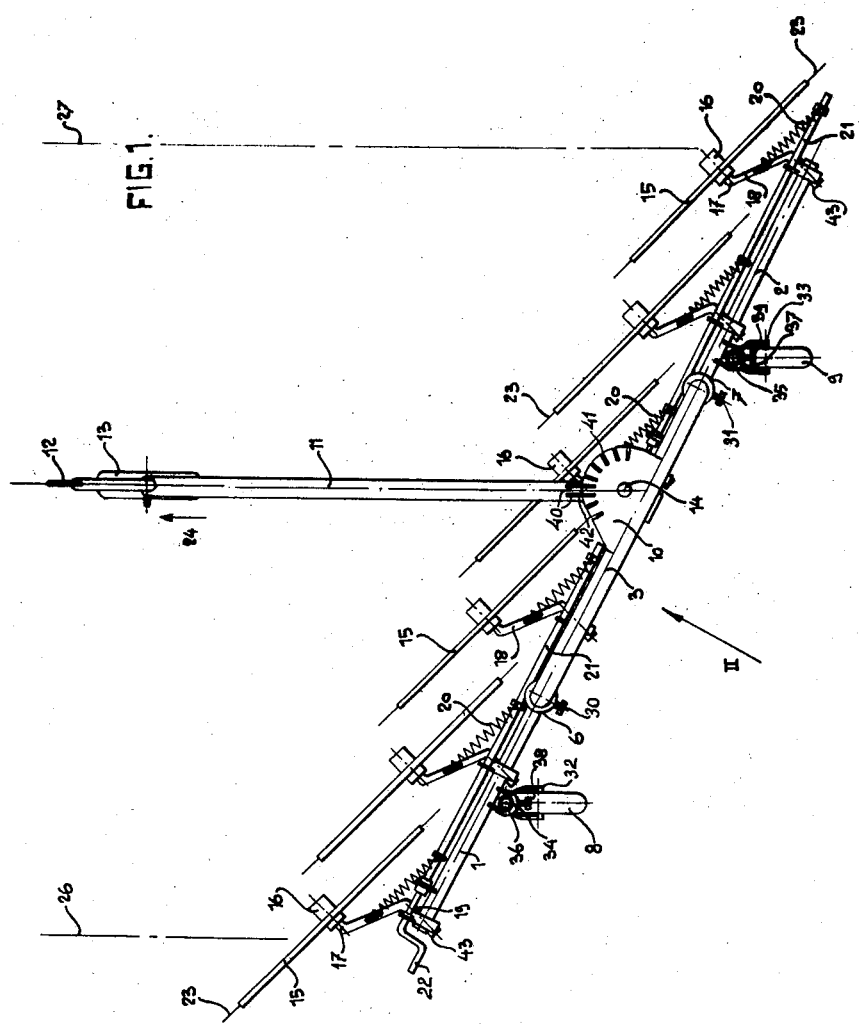

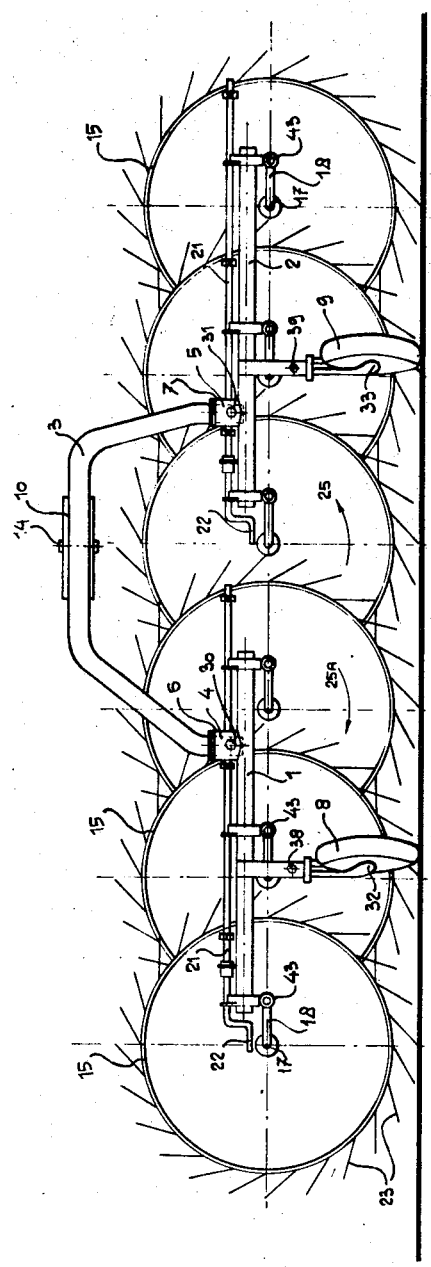

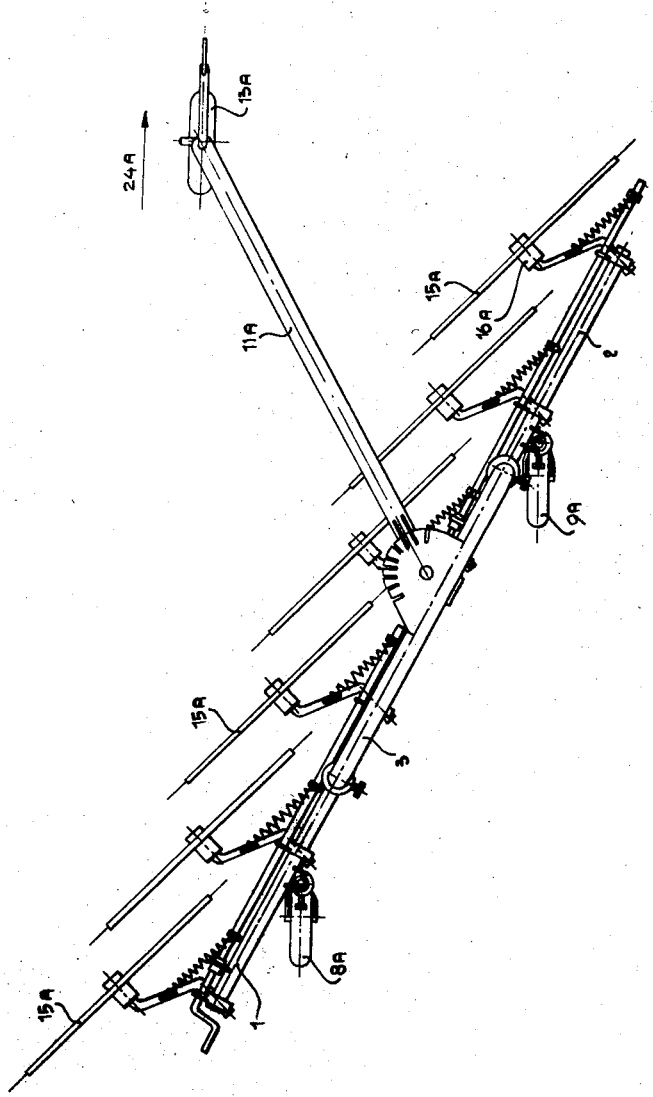

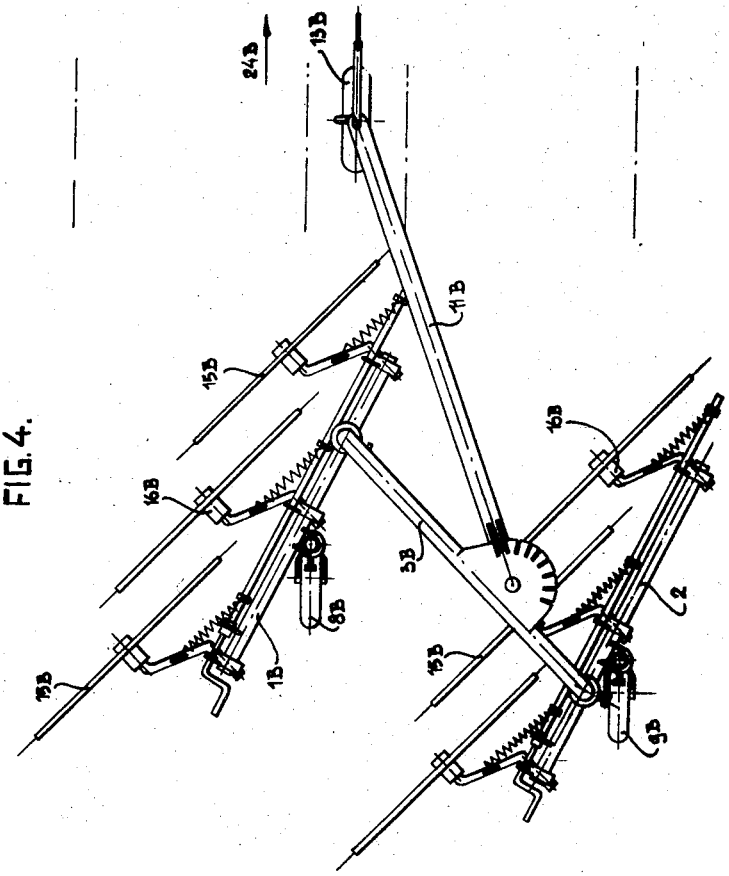

2,861,412

SIDE DELIVERY RAKING AND TEDDERING DEVICE

Cornelis van der Lely and Ary van der Lely, Maasland, Netherlands, assignors to C. van der Lely N. V., Maasland, Netherlands, a Dutch limited company Application October 15, 1953, Serial No. 386,298

Claims priority, application Netherlands October 17, 1952

19 Claims. (Cl. 56—377)

This invention relates to devices for loosening and aerating hay, grass or like material lying on the ground, and usually known as "tedding" devices, said device comprising at least one row of rake wheels which are put into rotation by coming into contact with the ground and/or the material lying thereupon and which are obliquely arranged with regard to the direction of travel of the devices.

It is an object of the present invention to provide a tedding device which may be very simply and readily transformed into a side delivery rake. According to the invention, the rake wheels in a row or in each row are in overlapping relation and are so arranged that of each two adjacent rake wheels a part of one of said rake wheels is located behind the front part of the other wheel, considered in the direction of travel of the device, and upon movement of the device in a direction transversely to the original travelling direction the device acts as a side delivery rake. By reason of this particular overlapping arrangement of the rake wheels, the latter when disposed for a tedding operation will not affect each other and consequently each rake wheel will form a narrow swath behind it. However, the device when moving in a direction transverse to the original travelling direction which corresponds to the operation as a tedding device, the rake wheels are adapted to take such relative positions that, considered in the new travelling direction, of each two adjacent rake wheels a part of one of said rake wheels is located behind the rear part of the other wheel, i. e. the overlapping rake wheels will cooperate with each other and each preceding wheel will deliver material sideways within the reach of a following rake wheel which in turn conveys the material again laterally towards the next rake wheel.

A further object of the invention is to make use of rake wheels wherein the teeth are inclined backwards in the direction of rotation of the wheel and to mount said rake wheels reversibly in a frame supported by adjustable running wheels which are located, considered with respect to the travelling direction, behind the rake wheels. In order to permit operation of the device as a side delivery rake, the device may then be moved in two directions which are substantially perpendicular, whereby the movement in that direction which, due to the inclined position of the teeth, necessitates reversal of the rake wheels presents the advantage that the rake wheels with their supporting members are turned away from the material to be raked together and that the running wheels need not ride across the material which has been raked together.

Another object of the invention is to permit an easy and rapid movement of the device when it acts as a tedding machine as well as when acting as a side delivery rake, and to provide a simple frame construction. According to the invention, this may be achieved by securing the rake wheels to a frame to which is connected a draw arm that can be locked in position in various directions.

A still further object of the invention is to provide for mounting the rake wheels on cranks supported by a frame which is located, considered with respect to the travelling direction, behind the rake wheels whereby the cranks of the rake wheels are forwardly directed.

It is also an object of the present invention to provide the device with means permitting said device to be used as a swath turner.

By way of example, an embodiment of the device according to the invention, which may be used as a tedding device and at the same time as a side delivery rake or as a swath turner, has been shown in the drawings, in which:

Fig. 1 is a plan view of a device embodying the present invention and shown disposed for operation as a teddering device;

Fig. 2 is an elevational view of the device as viewed in the direction indicated by the arrow II on Fig. 1;

Fig. 3 is a plan view similar to Fig. 1, but showing the device arranged for operation as a side delivery rake; and Fig. 4 is a plan view of the device, showing the latter arranged for operation as a swath turner.

The illustrated device comprises a frame which is constituted by two aligned supports or separate sections 1 and 2 connected together by means of a coupling bow or yoke 3. The vertical, cylindrical lower extremities 4 and 5 of the connecting bow 3 are rotatably mounted in vertical tubular members 6 and 7 which are respectively secured to the supports 1 and 2. Rotation of the supports 1 and 2 relative to the bow 3 may be prevented by means of locking or set screws 30 and 31 extending radially into the tubular members 6 and 7, respectively, for engagement with the extremities 4 and 5 of the connecting bow. During operation of the device as a teddering device (Fig. 1) and also as a side delivery rake (Fig. 3) the supports 1 and 2 are locked relative to the bow 3 in axially aligned positions. The support 1 is supported for ground traversing movement by a running wheel 8 located therebehind and the support 2 is correspondingly supported for ground traversing movements by a running wheel 9. The horizontal axles 32 and 33 of the running wheels 8 and 9 are rigidly connected to vertical axles 34 and 35, respectively, which are rotatable in cylindrical tubular members 36 and 37 rigidly connected to the supports 1 and 2, respectively. Locking bolts or set screws 38 and 39 extend radially into the members 36 and 37, so that the wheels 8 and 9 can be adjusted around vertical axes and can be locked in any desired positions. Such locking devices, as well as like locking devices which may hereinafter be mentioned, are conventional in themselves and may be any known device for preventing rotational displacement. Reference can be made, for example, to Patent No. 2,522,499 of September 19, 1950 (Berglund, et al., see element 16 and associated elements). To the coupling bow 3 is rigidly secured a connecting member 10 carrying a draft means or draw arm 11 which is provided at its free end with a draw hook 12 and is supported at said free end by an adjustable running wheel 13. The draw arm 11 is rotatable about a vertical axle 14 of the connecting member 10 and may be locked in position in various directions relative to the bow 3, for example, by means of metal strips 40 which are engageable in selected slots of a series of slots 41 in the member 10 and simultaneously in slots 42 in the arm 11.

On the side turned away from the supporting or running wheels 8 and 9, the supports 1 and 2 are each provided with three rake wheels 15. Each of said rake wheels is rotatably disposed with its hub 16 on the crank pin 17 of a crank 18, the crank shaft 19 of which is rotatably mounted in a related bearing 43 carried by the support 1 or 2. Each crank 18 is connected by a spring 20 to a rod 21 which is parallel to the support 1 or 2 in question and which, in order to provide for tensioning of the springs 20, is movable in longitudinal direction by the turning of an operating crank 22. The rake wheels 15 are provided with circumferential teeth 23 and due to their weight, said rake wheels tend to turn the cranks 18, opposite to the action of the springs 20, in such direction that the rake wheels 15 lightly contact the ground with the points of their tines With the above described parts positioned as shown in Fig. 1, the device acts as a teddering device when it is moved in the direction of the arrow 24 by a traction force applied to the draw arm 11. Due to this movement the rake wheels 15 rotate in the direction of the arrows 25 shown in Fig. 2, by which the hay lying on the ground in front of the rake wheels is worked along a width defined by the lines 26 and 27 (Fig. 1). Along this wide area, the hay is caught and lifted by each of said rake wheels and then released. Although the rake wheels overlap each other, this overlapping arrangement is such that of each two adjacent rake wheels, considered in the line of draft or travelling direction 24, the rear part of the next foremost rake wheel is located behind the front part of the following rake wheel so that none of the rake wheels can affect the working of an adjacent rake wheel.

If the draw arm 11 is swung from the position of Fig. 1 into the position 11A shown in Fig. 3 and is locked in this position, after which the device is moved in the direction of the arrow 24A, the running wheels being adjusted respectively the positions 13A, 9A and 8A, the device may be used as a normal side delivery rake, provided that the rake wheels 15 are first removed with their hubs from the crank pins 17, then reversed and secured in the reversed position on the crank pins, as shown in Fig. 3. This reversal of the rake wheels is necessary, if the teeth 23, as is the case in smaller rake wheels and as has been indicated, are rearwardly inclined in the direction of rotation of the wheel. Upon movement of the device in the direction 24A, the rake wheels will rotate in opposite direction and consequently the inclined position of the teeth 23 should be adapted to the new direction of rotation by the reversal of the rake wheels. It will be readily understood that upon movement of the device in the direction of the arrow 24A, the overlapping arrangement of the rake wheels will be such as is required for a good raking action, i. e. considered in the travelling direction 24A the front part of the trailing rake wheel of each two consecutive rake wheels will be overlapped by the rear part of the preceding one of said rake wheels. Thus the overlapping rake wheels will cooperate with each other in such a manner that each preceding rake wheel will put the material delivered sideways within the reach of the following rake wheel.

Finally the device may serve as a swath turner as well. The coupling bow 3 is then swung with respect to the support 2 into the position 3B shown in Fig. 4, while the support 1 is swung relative to the bow to the position 1B and the rake wheels connected to said support will take the positions 15B, the draw arm being put into the position 11B. By the rake wheels 15B of the support 1B on the one hand and by the rake wheels 15 of the support 2 on the other hand, a separate swath will then be turned.

When used as a tedding device (in the direction of arrow 24) and when used as a side delivery rake (direction of traction 24A), the running wheels 8 and 9, respectively of the device, may be self-adjusting or swivel wheels.

By means of the operating crank 22 which, when manipulated, varies the tension in springs 20 the cranks 18 of the rake wheels may be turned in their bearings so as to adjust the pressure of the rake wheels 15 on the ground and, if desired, to lift said rake wheels entirely from the ground.

In the illustrated tedding device the rake wheels are arranged in a single row. It will be understood that said wheels may be arranged as well in two or more rows disposed in echelon with regard to each other.

What we claim is:

1. A tedding device comprising a mobile frame, draft means operatively associated with said frame and extending laterally therefrom in substantially the line of draft, at least one supporting wheel operatively associated with said frame and having means associated with said frame for insuring rotation thereof in a plane substantially parallel to the line of draft, and at least two raking wheels operatively associated with said frame in overlapping relation, one of said raking wheels being generally ahead of the other and the other of said raking wheels having a leading portion in front of a portion of said first mentioned wheel whereby the device may function as a tedder.

2. A tedding device comprising a mobile frame, draft means coupled to said frame and defining a line of draft, at least one supporting wheel coupled to said frame, locking means coupled to said frame and said supporting wheel for limiting the rotation of said supporting wheel to a plane substantially parallel to the line of draft, and at least two overlapping raking wheels coupled to said frame, one of said raking wheels being generally in front of the other raking wheel relative to the line of draft, the said other raking wheel including a leading portion in front of a portion of said first mentioned wheel whereby the device can function as a tedder.

3. A device as claimed in claim 2 comprising adjustment means operatively associated with said draft means and adjustably coupling the same to said frame whereby said draft means is adjustable to at least one other position defining a second line of draft.

4. A device as claimed in claim 2 comprising adjustment means operatively associated with said draft means and adjustably coupling the same to said frame whereby said draft means is adjustable to at least one other position defining a second line of draft, and wherein said locking means includes means for limiting said supporting wheel to a second plane corresponding to the second line of draft.

5. A device as claimed in claim 2 comprising cranks coupling said raking wheels to said frame and resilient means coupled to said cranks for limiting the pressure of the raking wheels on the ground.

6. A device as claimed in claim 2 comprising cranks coupling said raking wheels to said frame and resilient means coupled to said cranks for limiting the pressure of the raking wheels on the ground, said resilient means comprising a rod adjustably supported on said frame, and springs connected between said rod and said cranks.

7. A device as claimed in claim 2 comprising cranks coupling said raking wheels to said frame and resilient means coupled to said cranks for limiting the pressure of the raking wheels on the ground, said resilient means comprising a rod adjustably supported on said frame, and springs connected between said rod and said cranks, and means for rotating said rod for adjusting the tension of said springs.

8. A device as claimed in claim 2 wherein said frame comprises two separate sections and a yoke pivotally supporting said sections, said draft means being coupled to said yoke.

9. A device as claimed in claim 2 wherein said frame comprises two separate sections and a yoke pivotally supporting said sections, said draft means being coupled to said yoke; said device further including supporting wheels coupled to each of said sections.

10. A device as claimed in claim 2 wherein said frame comprises two separate sections and a yoke pivotally supporting said sections, said draft means being coupled to said yoke; said device further including locking devices between said sections and said yoke for fixing the relative positions thereof.

11. A device as claimed in claim 2 wherein said frame comprises two separate sections and a yoke pivotally supporting said sections, said draft means being coupled to said yoke; said yoke including substantially vertical portions pivotally supporting said sections.

12. A device as claimed in claim 2 comprising a support wheel operatively associated with said draft means for facilitating ground traversing movement.

13. A device as claimed in claim 2 comprising means for mounting said raking wheels on said frame for rotation by contact with the ground.

14. A device as claimed in claim 2 comprising means for locking said draft means at an acute angle relative to said frame.

15. A device as claimed in claim 3 wherein said adjustment means includes means for locking said draft means selectively in a plurality of positions relative to said frame.

16. A device as claimed in claim 6, wherein said frame is substantially linear, said rod being longitudinally adjustable relative to said frame.

17. A device as claimed in claim 8 comprising a locking device for locking said draft means relative to said yoke.

18. A device as claimed in claim 8 comprising means for locking said yoke and sections in relative positions whereat the sections are parallel.

19. A device as claimed in claim 8 comprising means for locking said yoke and sections in relative positions whereat the sections are parallel with controllably varying distances therebetween.

References Cited in the file of this patent

UNITED STATES PATENTS

| | | |
|---|---|---|
| Re. 23,411 | Stenzel | Sept. 11, 1951 |
| 2,447,354 | Morrill | Aug. 17, 1948 |
| 2,472,260 | Morrill | June 7, 1949 |
| 2,635,411 | Hicks | Apr. 21, 1953 |
| 2,672,721 | Adams | Mar. 23, 1954 |
| 2,680,343 | Enos | June 8, 1954 |
| 2,712,723 | Ryan | July 12, 1955 |

FOREIGN PATENTS

| | | |
|---|---|---|
| 815,123 | Germany | Sept. 27, 1951 |
| 680,537 | Great Britain | Oct. 8, 1952 |